United States Patent [19]

Cambra

[11] 3,795,840
[45] Mar. 5, 1974

[54] OVERVOLTAGE PROTECTION NETWORK

[75] Inventor: Joseph M. Cambra, Santa Clara, Calif.

[73] Assignee: The United States of America as represented by the Administrator of the National Aeronautics and Space Administration, Washington, D.C.

[22] Filed: Nov. 29, 1972

[21] Appl. No.: 310,624

[52] U.S. Cl. .................................... 317/16, 317/31
[51] Int. Cl. ............................................ H02h 3/20
[58] Field of Search ................................ 317/16, 31

[56] References Cited
UNITED STATES PATENTS

| 3,382,409 | 5/1968 | Assow et al. | 317/16 |
| 3,353,066 | 11/1967 | DeSouza | 317/16 X |
| 3,334,271 | 8/1967 | Bacon | 317/16 |
| 3,480,832 | 11/1969 | Person | 317/16 |

Primary Examiner—James D. Trammell
Attorney, Agent, or Firm—Darrell G. Brekke; Armand G. Morin, Sr.; John R. Manning

[57] ABSTRACT

Electrical equipment to be protected from overvoltage is connected with a possible source of overvoltage via an input conductor. A fuse is connected in series with the input conductor and a spark gap is connected between the input conductor and ground for conducting the overvoltage current to ground and for blowing the fuse to open the circuit to the electrical equipment. A pulse attenuator network is provided between the spark gap and the electrical equipment to be protected for attenuating the pulse of energy passing through the fuse and spark gap prior to blowing of the fuse. The pulse attenuator network includes additional shunt spark gaps, series inductance, and a series connection of a twisted shielded pair of conductors having low-voltage insulation.

3 Claims, 3 Drawing Figures

Fig_1

3,795,840

OVERVOLTAGE PROTECTION NETWORK

The invention described herein was made by an employee of the United States Government and may be manufactured and used by or for the Government for governmental purposes without the payment of any royalties thereon or therefor.

DESCRIPTION OF THE PRIOR ART

Heretofore, protective networks for protecting electrical equipment from overvoltages have employed spark gaps and gas filled tubes to shunt overvoltage and excessive currents from the input conductor to ground. In addition, such protective networks have employed a series connected fuse for disconnecting or open circuiting the source of overvoltage or current from the electrical equipment to be protected. Such a protective network is described in U. S. Pat. No. 3,448,341, and NASA Tech Brief No. 69–10490, October, 1969.

While such a prior art overvoltage protective network is useful for protecting electrical equipment from sources of overvoltage it is desirable to provide additional protection. More particularly, such a prior art overvoltage protective network serves to convert a step function of overvoltage to a pulse of overvoltage which can travel into the circuit to be protected. The pulse of energy comes about due to the finite time required for the fuse to blow and disconnect the electrical circuit to be protected from the source of overcurrent or voltage. In certain applications where very high voltage and power is encountered, such as in a Mach 50 wind tunnel utilizing a 15-megawatt electrical discharge in a shock tube to produce a high velocity and temperature gas stream, the overvoltage leakage pulse energy can be substantial. It is desirable to provide an overvoltage protective network which greatly reduces the leakage pulse energy flowing to the electrical equipment to be protected.

SUMMARY OF THE PRESENT INVENTION

The principal object of the present invention is the provision of an improved overvoltage protection network.

In one feature of the present invention, a pulse attenuator network is provided in the circuit connecting the possible source of overvoltage to the electrical equipment to be protected, such pulse attenuator means being connected between a fuse which is blown and the equipment to be protected for attenuating the leakage pulse energy otherwise flowing to the equipment to be protected.

In another feature of the present invention, the pulse attenuator network includes a series inductor and a shunt nonlinear conductive device, such as a spark gap, gas filled tube, triac, SCR, or the like for shunting overvoltage pulse energy from the electrical equipment to be protected.

In another feature of the present invention, the pulse attenuator network includes a shielded twisted pair of low-voltage insulated wires one of which is series connected between the fuse of the protective network and the electrical equipment to be protected for introducing a distributed nonlinear loss for heavily attenuating the pulse overvoltage energy as applied to the electrical equipment to be protected.

In another feature of the present invention, the output of the pulse attenuator network is shunted from the electrical equipment to be protected via an additional nonlinear conductive device selected to become conductive when a certain threshold voltage appears thereacross, for further shunting leakage pulse energy from the electrical equipment to be protected.

Other features and advantages of the present invention will become apparent upon a perusal of the following specification taken in connection with the accompanying drawings wherein:

DESCRIPTION OF THE PREFERRED EMBODIMENTS

Figure 1:
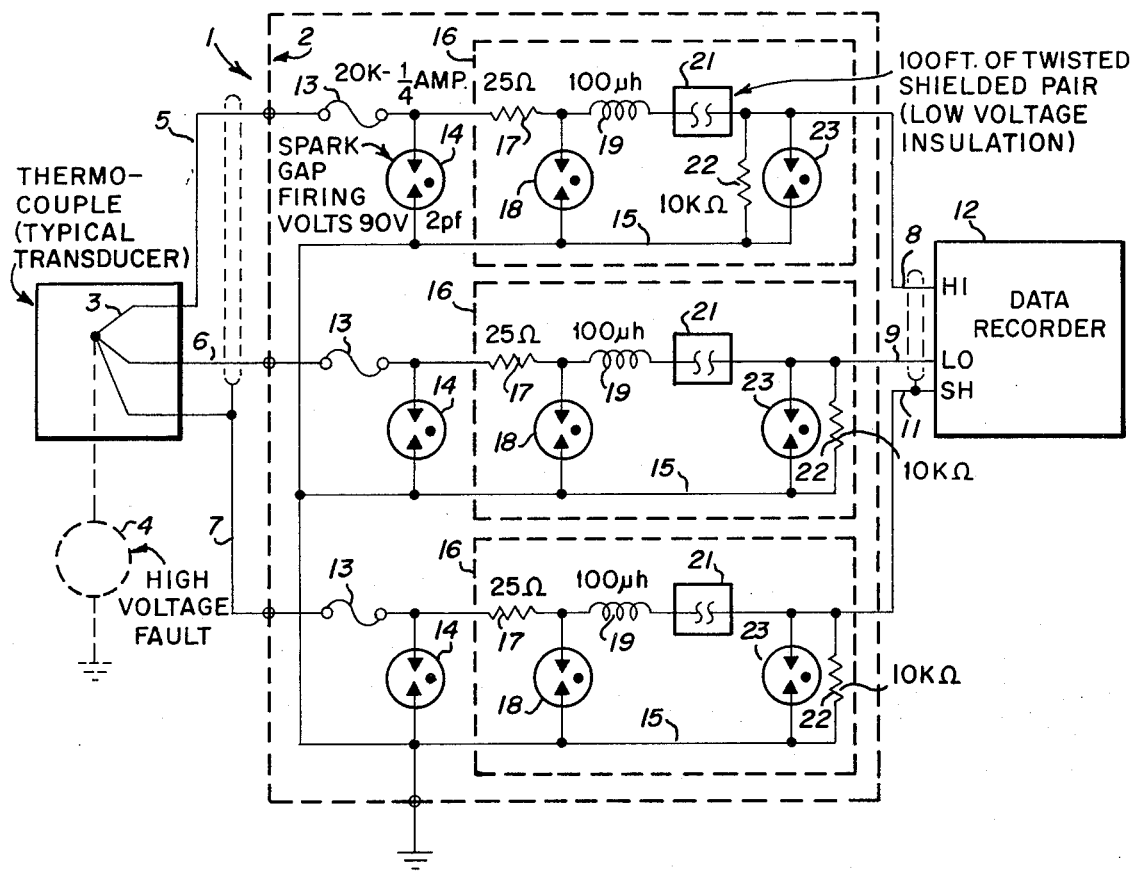
FIG. 1 is a schematic circuit diagram, partly in block diagram form, depicting an electrical circuit incorporating an overvoltage protection network of the present invention.

Referring now to FIG. 1, there is shown an electrical measuring circuit 1 incorporating an overvoltage protection network 2 of the present invention. In the measuring circuit, a thermocouple 3 or other suitable transducer is located in an environment for sensing a parameter to be measured. For example, the thermocouple 3 may be located in the region of a plasma discharge of a shock tube in a Mach-50 wind tunnel where it is exposed to a possible source of overvoltage 4, such as the high-voltage terminal of the plasma discharge by breakdown of the gas in the vicinity of the test model. In a typical wind tunnel, the anode voltage is +9 kV and the power in the discharge is approximately 15 megawatts.

The output of a thermocouple 3, which includes a high-voltage conductor 5, a low-voltage conductor 6, and a shield conductor 7, is connected to respective input terminals 8, 9 and 11 of a data recorder 12 via the intermediary of the over-voltage protection network 2. The overvoltage protection network serves to protect the data recorder 12 from the possible source of overvoltage as applied to input leads 5, 6 and 7.

In the overvoltage protection network 2, each conductor 5, 6 and 7 includes a series connection of a fuse 13, such as a fuse rated for ¼ A RMS, 20 kV and having 12 ohm DC resistance. The output end of each fuse 13 is connected to ground via a spark gap 14 which has a relatively low firing threshold voltage, as of 90 volts, and which presents a relatively low capacitance, as of 2 picofarads, in the non-fired state.

The spark gap 14 when the overvoltage appearing thereacross exceeds the firing or threshold potential, fires and serves to shunt the source of high voltage 4 through the fuse 13. If excessive current is drawn by the fuse 13, the fuse blows and serves to disconnect the data recorder 12 from the source of overvoltage 4. In a typical example, the spark gap 14 is rated at 90 VDC breakdown, 5KA surge current, 5 A AC, with greater than $10^{10}$ ohms leakage resistance and less than 2 pf capacity when not fired. In addition, the spark gap 14 is preferably adequately heat sinked by mounting opposite terminals thereof to a pair of copper busbars, one of which is a copper ground bus 15.

Thus, in operation, when the overvoltage is applied, it builds up across the spark gap 14 until the firing threshold is reached, at which time it conducts current to ground, thereby blowing the fuse 13 and disconnecting the data recorder 12 from the source of overvoltage 4. This creates an overvoltage leakage pulse at the output of the fuse 13 which is then attenuated by means of a pulse attenuative portion 16 of the protective network connected between the fuse and the data recorder 12.

More particularly, each of the pulse attenuative networks 16 includes a resistor 17, as of 25 ohms, series connected with each of the respective leads 5, 6 and 7. A second spark gap 18, which is identical to the first spark gap 14, is connected between the output of resistor 17 and the ground bus 15 to form with resistor 17 a first nonlinear low-pass filter network. More particularly, as the pulse of overvoltage leakage energy builds up across the capacitance of the spark gap 18 and reaches the firing threshold, the spark gap 18 fires and shunts the respective conductor 5, 6 or 7 to ground.

That portion of the overvoltage leakage pulse which passes the series resistor 17 and shunt spark gap 18 is further attenuated by means of a series choke 19 having an inductance as of 100 microhenries. In a typical example, the choke 19 is an R.F. type, rated for 325 ma, 3.2 ohm, with a Q greater than or equal to 42, and a dielectric breakdown of 1,400 volts RMS. The output of the inductor 19 is connected to a hundred-foot length of twisted shielded pair cable 21 having conductors 8 and 9 and shield 11.

The cable 21 is also terminated by connection to ground via a parallel connection of a resistor 22 and a third spark gap 23. Spark gap 23 is identical to the previously described spark gaps 14 and 18 and serves to further attenuate pulse energy passing through the lossy cable 21 to the data recorder 12.

In a typical example, resistor 22 comprises a one-half watt, 0.1 percent noninductive precision wire wound resistor of 10 K $\Omega$ resistance and cable 21 is 100 feet long consisting of two No. 24 tinned copper stranded wires in a 100 percent foil shield, having a nominal capacitance of 55 pf per foot. Such a cable 21 has relative low voltage insulation and pulse energy is rapidly attenuated in the cable 21. The resistance of resistor 22 affects the measuring characteristics and it may be altered or omitted depending on the impedance of the transducer and the impedance of the readout device.

The output of the pulse attenuative network 16 is applied to the respective inputs 8, 9 and 11 of the data recorder 12.

Figure 2:
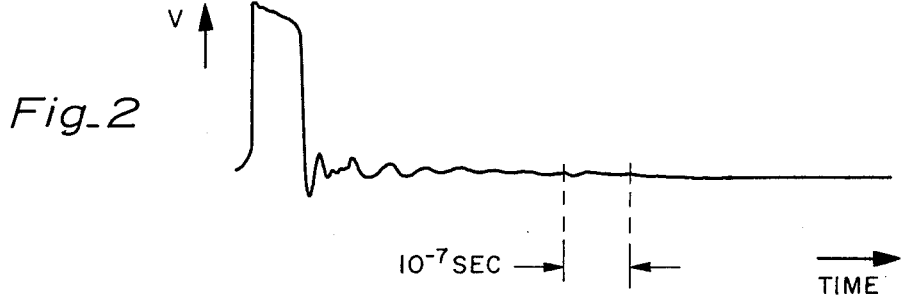
FIG. 2 is a waveform diagram depicting the waveform of a leakage overvoltage pulse at the output of the fuse in the circuit of FIG. 1.
Figure 3:
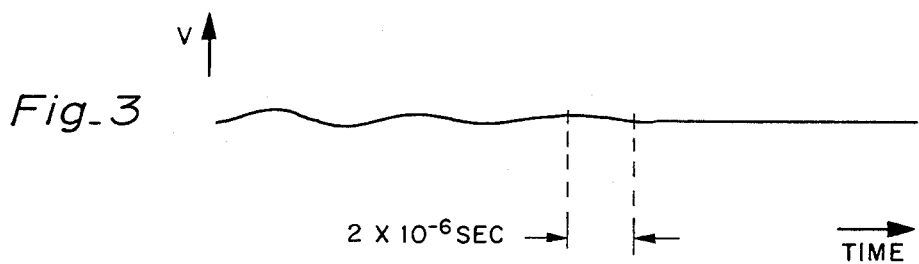
FIG. 3 is a waveform diagram of the leakage pulse energy as finally applied to the input of the electrical equipment to be protected in the circuit of FIG. 1.

In operation, with an overvoltage plasma discharge source 4 of 9.1 kV and a power of 15 megawatts applied directly to the input of the protective network 2, less than $6.0 \times 10^{-8}$ watt-seconds (0.6 ergs) at a peak voltage of 600 volts appeared at the input of the data recorder 12. The fuse 13, in combination with the first shunting spark gap 14, converted a high energy and voltage step input function as produced by applying the aforecited potential to the input of the protective network 2 to a low energy overvoltage leakage pulse function of less than 200 nanoseconds wide, as shown by the waveform of FIG. 2. This pulse waveform is heavily attenuated by the pulse attenuator network 16 to produce a resultant pulse at the input of the data recorder having a waveform of the type shown in FIG. 3.

The advantage of the overvoltage protective network 2 of the present invention is that it provides both personnel and equipment protection from overvoltage and current which exceeds the fuse rating or the firing voltage rating of the spark gaps 14, 18 and 23. Its simplicity results in a large cost reduction over other methods. In addition, the protection circuit 2 is passive except for the condition of overload, therefore, it results in no need for calibration.

What is claimed is:

1. A protection system for an a-c measurement system operating in a high-voltage, high-energy environment comprising:
   a transducer capable of generating an a-c signal;
   said transducer having at least two conductors;
   a ground bus;
   each of said conductors having a fuse and a spark gap connected in series between said conductor and said ground bus, a high energy-handling, pulse-attenuative, low-pass filter network having an input and an output, said low-pass filter network having a cut-off frequency above the frequency of said a-c signal, said input of said network being coupled in shunt with said spark gap;
   means for reading out said a-c signal from said transducer;
   said means for reading out said a-c signal being coupled to said outputs of said low-pass filter network; and
   said filter network, in the case of a high-voltage, high-energy fault, being able to reduce the energy reaching said means for reading out of a level that can be safely tolerated.

2. A protection system as set forth in claim 1 wherein said low-pass filter network includes a resistor having first and second terminals, a second spark gap, said first terminal of said resistor connected to said node of said fuse and said first spark gap, said second spark gap connected between said second terminal of said resistor and said ground bus, an inductance having first and second terminals, a third spark gap having first and second terminals, said first terminal of said terminal of said inductance being connected to said node of said resistor and said second spark gap, said first terminal of said third spark gap being connected to said ground bus, means for producing a long distributed capacitance with respect to said ground bus, said means being connected between said second terminal of said inductance and said second terminal of said third spark gap, and said second terminal of said third spark gap comprising an output terminal of said low-pass filter network.

3. A protection system as set forth in claim 2 wherein said transducer has three conductors and said means for producing a long distributed capacitance comprises a long twisted-pair shielded cable having a low-voltage insulation.

* * * * *